(12) United States Patent
Giordano et al.

(10) Patent No.: US 6,219,438 B1
(45) Date of Patent: Apr. 17, 2001

(54) PRODUCE INDENTIFIER USING BARCODE SCANNER AND WAVELET IMAGE PROCESSING AND HAVING COMPENSATION FOR DIRT ACCUMULATED ON VIEWING WINDOW

(75) Inventors: David A. Giordano, Sayreville; Gregory P. Kochanski, Dunellen, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/922,796

(22) Filed: Sep. 2, 1997

(51) Int. Cl.⁷ ........................................... G06K 9/00
(52) U.S. Cl. ............................................ 382/110
(58) Field of Search .................... 382/108, 190, 382/191, 203, 225; 356/237.3; 348/89, 91

(56) References Cited

U.S. PATENT DOCUMENTS

| | | | |
|---|---|---|---|
| 4,737,857 | * | 4/1988 | Rucci et al. ........................ 358/412 |
| 4,881,068 | * | 11/1989 | Korevaar et al. ...................... 345/6 |
| 4,881,818 | * | 11/1989 | Bustamante et al. ................ 356/367 |
| 4,988,852 | | 1/1991 | Krishman . |
| 5,214,470 | * | 5/1993 | Denber ................................. 355/75 |
| 5,220,617 | * | 6/1993 | Bird et al. ........................... 382/149 |
| 5,325,301 | | 6/1994 | Knoff et al. . |
| 5,392,255 | | 2/1995 | LeBras et al. . |
| 5,426,506 | * | 6/1995 | Ellingson et al. ................... 356/369 |
| 5,497,777 | | 3/1996 | Abdel-Malek et al. . |
| 5,511,155 | | 4/1996 | Yamaguchi . |
| 5,526,816 | | 6/1996 | Arditi . |
| 5,546,475 | * | 8/1996 | Bolle et al. ......................... 392/190 |
| 5,569,901 | | 10/1996 | Bridgehall et al. . |
| 5,569,905 | | 10/1996 | Ohkawa et al. . |
| 5,684,894 | * | 11/1997 | Shustorovich ...................... 382/232 |
| 5,729,473 | * | 3/1998 | Blanc et al. ........................ 702/128 |
| 5,815,198 | * | 9/1998 | Vachtsevanos et al. ............... 348/88 |
| 5,818,028 | * | 10/1998 | Meyerson et al. .................. 235/472 |
| 5,841,121 | * | 11/1998 | Koenck .......................... 235/472.01 |
| 6,005,959 | * | 12/1999 | Mohan et al. ...................... 382/110 |

* cited by examiner

Primary Examiner—Joseph Mancuso
Assistant Examiner—F. E. Cooperrider

(57) ABSTRACT

A system and method identify objects, such as fruits, vegetables, and images through the recognition of unique surface features represented by signals from a scanner that pass over the objects. The scanner signals are processed by applying a modified wavelet transform to them and comparing the results to previously stored data. The system uses an optical scanner, a processor that transforms the data acquired by the scanner to extract a translation invariant feature vector, and a comparator which compares the transformed signal to a predetermined set of vectors for a corresponding identification based upon the comparison set.

41 Claims, 10 Drawing Sheets

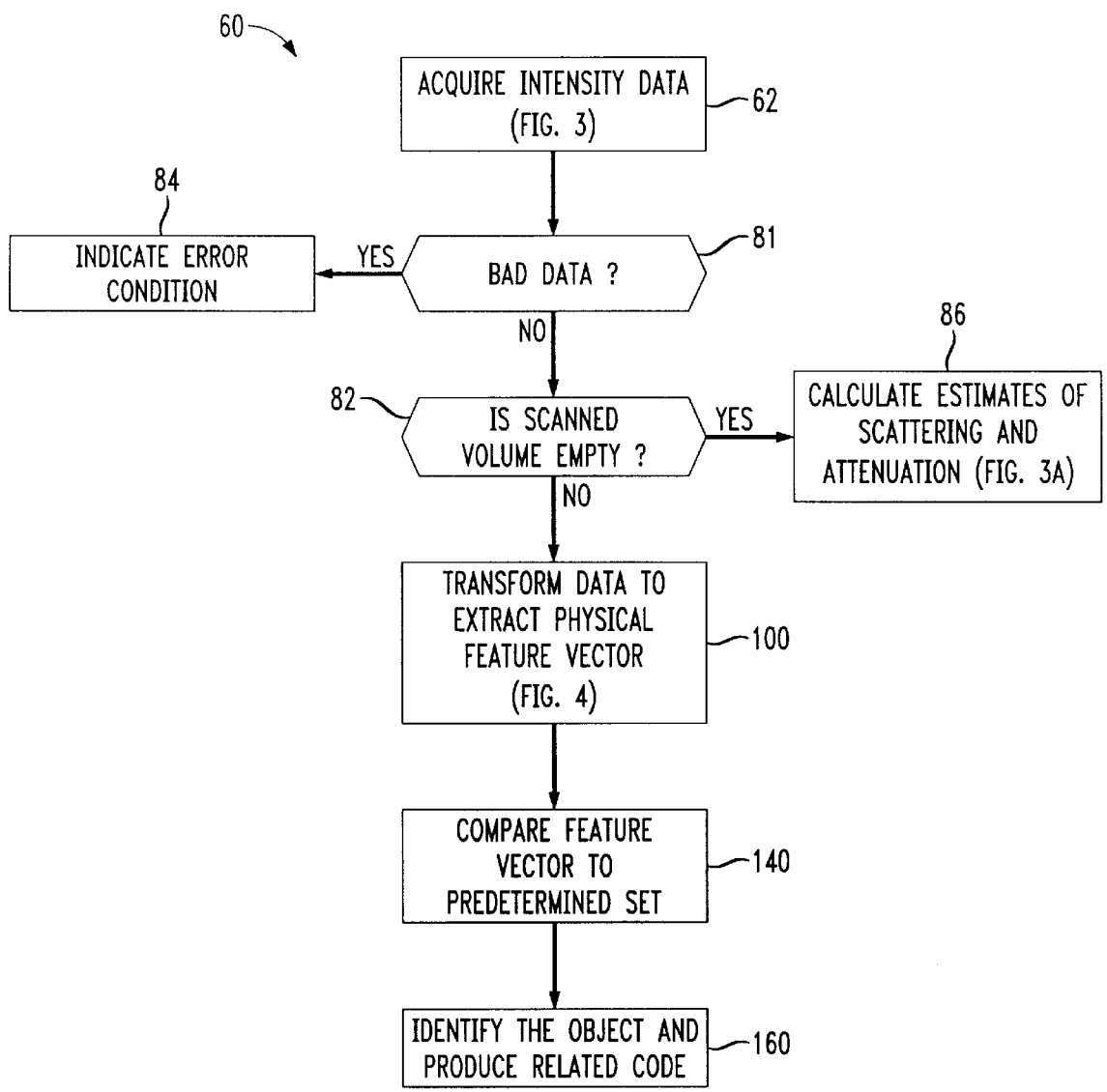

PRODUCE INDENTIFIER USING BARCODE SCANNER AND WAVELET IMAGE PROCESSING AND HAVING COMPENSATION FOR DIRT ACCUMULATED ON VIEWING WINDOW

FIELD OF THE INVENTION

The invention relates to a system and method of identifying objects, and, more particularly, a system and method of identifying fruits and vegetables based on their respective unique surface textures sensed by an optical scanner.

BACKGROUND OF THE INVENTION

Modern supermarkets rely on relatively fast checkout procedures to maintain competitive advantages over relatively smaller scale grocers. Checkout usually involves determining a customer's total bill and receiving payment for purchased products corresponding to the bill. Many factors can influence improvements in customer throughput, which are directed to the overall goal of maximizing sales and reducing the time a consumer spends waiting in line.

By maximizing the volume of products sold, grocery chains tend to compete more effectively because overall prices may be lowered to attract a greater number of shoppers and still maintain acceptable profits. Moreover, in reducing the time a consumer waits in line at the checkout stand, customer satisfaction increases, tending to improve the probability of that customer returning. One of the keys to the grocery industry's success in maximizing customer throughput and minimizing checkout times involves a coded label known as a bar code.

A typical bar code includes a two-dimensional pattern comprising horizontally adjacent black and white vertical bars of varying widths. The respective widths and positions correspond to a coded identification number representing a particular item. The code is printed on a label that is affixed to the item, eliminating the need for a separate price tag. At the time of purchase, instead of manually inputting a price using register keys, the grocery clerk merely positions the bar code within the field of view of a bar code scanner. The scanner reads the code, automatically rings up the product price, and causes the name of the item and the price to print out on a convenient receipt.

Conventional bar code readers generally include a laser beam directed along a scanning path by a rotating mirror. A photodetector, positioned within the scanner and oriented substantially along the path of light reflected from the bar code and received within the scanner beam, detects the reflections of the beam from a targeted surface. When the scanner targets a bar code, the reflected components of the beam vary in intensity depending on whether the reflection was incident a white or black bar. An input filter analyzes the data to determine components that exceed respective positive and negative thresholds corresponding to transitions between black and white bars. The coded transitions are then decoded by a bar code processor to command the register to automatically ring up the product and its corresponding price.

While conventional bar code scanners are beneficial for their intended purposes, i.e. to dramatically improve supermarket checkout times, such scanners typically only identify the contents of bar codes. This proves problematic for produce. As a result, most checkout stand equipment typically requires the operator or clerk to manually input a code identifying the many fruits and vegetables purchased and the corresponding price. Unfortunately, this procedure requires a substantial amount of training for the checkout stand clerks to properly recognize and identify the fruits and vegetables. Even with the investment in costly training, error rates often run as high as twenty percent. Moreover, the procedure frequently involves significant delays, since the clerk often must refer to a price table to match the items to the proper prices.

A limited solution to the above problem involves affixing individual labels to all fruits and vegetables. These labels typically comprise a human-readable name or number, and may include a bar code. Such labels tend to eliminate most identification errors, but fail to speed up the checkout procedure.

Although applying labels to individual articles of produce appears beneficial in some instances, problems exist for many fruits and vegetables. In one aspect, the sheer numbers of fruits and vegetables create significant labor costs in order to effect the labeling procedure. Much of the cost arises from assigning employees to individually apply the labels to sizeable quantities of produce. Further, label removal by customers from fruits and vegetables having delicate surfaces often damages those surfaces due to the adhesive associated with the labels.

Because of the problems described above, those skilled in the art have recognized the need for a system and method of identifying produce in a timely and efficient manner in order to minimize checkout times, maximize pricing accuracy, and eliminate unnecessary food waste. The system and method of our present invention satisfies these needs.

SUMMARY OF THE INVENTION

The system and method of our present invention provide the capability of identifying produce without the need for extraneous labels or other attachable identification indicia. By analyzing the unique surface texture of the produce itself, the invention substantially reduces costs by minimizing labor and pricing errors during checkout. Additionally, checkout times are measurably improved through the elimination of unnecessary delays attributable to finding and properly positioning a label for reading by a clerk or scanning. Consumer satisfaction will also increase through the elimination of the need to remove potentially damaging adhesive labels.

To realize the advantages summarized above, the system of the present invention identifies objects having respective physical surface properties, such as texture, and includes a computer having a memory and an optical scanner responsive to the computer. The scanner has an optical source for generating a laser beam of a predetermined wavelength for scanning over the textured surface and producing reflected intensity data representative of the textured surface. An optical signal detector senses the reflections of the beam incident upon the surface. Means are provided for transforming the intensity data so that a feature vector, comprising a plurality of vector components, can be extracted. The components have respective coefficients corresponding to at least one physical property representative of the surface, e.g. its texture. Also provided in the system is a means for comparing the extracted feature vector to a set of predetermined feature vectors stored in the memory and representing a plurality of object types in order to determine whether the article has a surface feature similar to the surface of any one of the objects represented by the predetermined vectors included in the set.

The method of the present invention identifies an object having respective surface properties, e.g. texture, with an optical scanner. The scanner has a laser beam and an optical signal detector coupled to a computer. More particularly, the method includes the steps of first acquiring data representative of the intensity of reflections of the beam incident on the textured surface of the object. The method proceeds by transforming the intensity data so as to extract a translation invariant physical feature vector comprising a plurality of vector components. The vector components include respective coefficients corresponding to at least one physical property representative of the surface. The method then concludes by comparing the extracted feature vector to a set of predetermined feature vectors representing a plurality of object types to determine whether the article has a surface similar to any one of the objects represented by the predetermined vectors included in the set.

BRIEF DESCRIPTION OF THE DRAWINGS

The foregoing and other features and advantages of the present invention will be more readily apparent from the following detailed description when read in conjunction with the accompanying drawings wherein:

FIG. 2 is a flow chart illustrating steps according to one embodiment of the method of the present invention;

DETAILED DESCRIPTION OF THE PREFERRED EMBODIMENTS

The system and method of the present invention identify articles of produce by detecting data representing physical properties, such as produce surface texture, and transforming the data into a translation invariant physical feature vector. A comparison of the feature vector to a predetermined set of vectors determines the produce identification.

Figure 1:
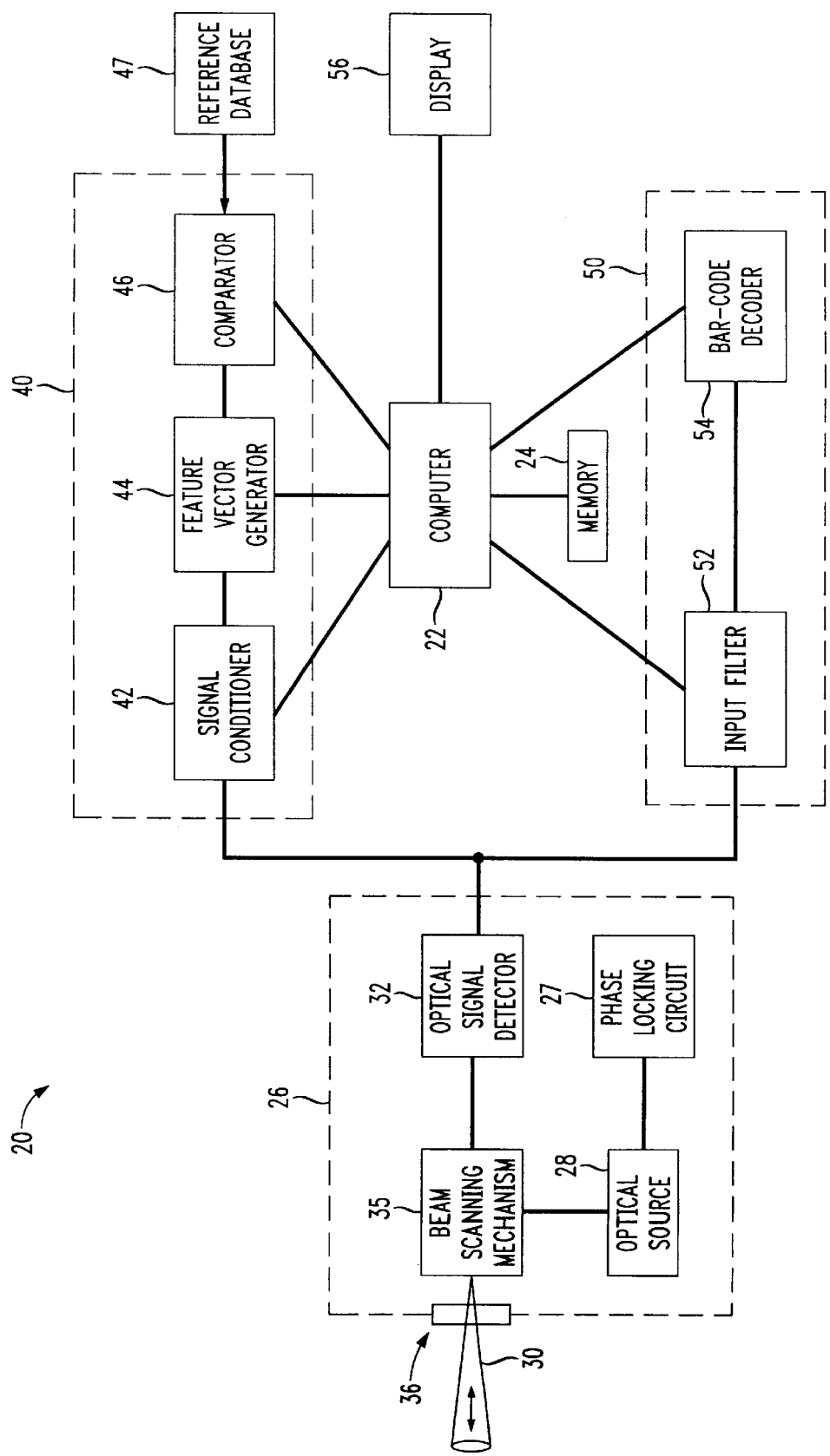
FIG. 1 is a functional schematic of a produce identification system according to one embodiment of the present invention.

Referring now to FIG. 1, the system of the present invention, generally designated 20, includes a computer 22 having memory 24, an optical scanner 26 for targeting and detecting a textured surface 34, and a produce processor 40. The term texture, as used herein, may include mechanical roughness along the external surface or skin, variations in the reflectivity of the produce, and the gross shape of the external surface of the object or a portion thereof. Texture may also comprise a surface condition such that several measurements taken at a particular location produce reflections of different colored light or reflections in multiple directions of illumination.

The computer 22 used in the system, and the method of the present invention, may be configured any number of ways, as is known to those skilled in the art. Preset commands in the form of software are stored in the memory 24 to effect the steps utilized in the method of the present invention and to control the operation of the apparatus that comprise the present.

With continued reference to FIG. 1, the optical scanner 26 includes an optical source 28 for generating a laser beam 30, a mirror mechanism 35 for scanning the laser beam along a predetermined field of view, and a phase-locking circuit 27 for determining the frequency of rotation of the mirror mechanism. In one embodiment, the laser is switchable, enabling data collection with the beam both on and off. Typical lasers implemented in conventional bar code scanners operate with wavelengths approximating 670 to 680 nanometers. While such lasers may be operated with the present invention, we have discovered that lasers having wavelengths approximating either 575 or 775 nanometers provide substantially better reflectivity for produce identification because chlorophyll has an absorption peak at 670–680 nm, making dark green produce nearly invisible to such a scanner.

Cooperating with the optical source 28 to effect data collection is an optical signal detector 32 for sensing reflections of the laser light incident on the targeted textured surface 34 of an article of produce. The detector comprises a photodiode-like device sensitive to a band of desired optical wavelengths. It generates a composite optical signal comprising spectral reflections of the beam combined with ambient background noise. The noise typically results from diffuse illumination sources such as the sun, fluorescent lights, and the like. The detector 32 accepts light from a small region of space, which is simultaneously scanned by the mirror mechanism 35, so that the detector sensitive region substantially overlaps the area illuminated by the optical source 28. Additionally, a window 36 protects the optics from dirt.

Further referring to FIG. 1, a produce processor 40 is connected to the output of the detector 32 and is used to manipulate and transform the detected composite signal into manageable data. The input to the processor includes a signal conditioner 42 which amplifies the detected signal, filters the ambient background noise from the composite signal, converts the data to digital form, and compensates for the nonideal behavior of the optical scanner 26 due to dirt or contamination. The conditioner is responsive to commands from the computer 22 according to the method of the present invention, described in detail below.

The conditioned output of the detector 32 comprises modulated data corresponding to the intensity of the reflections detected. To take advantage of the spatial information in the wavelet domain, the output of the signal conditioner 42 feeds the resultant reflectivity signal to a wavelet transformer or feature vector generator 44. The transformer, which is typically implemented as software inside the computer, responds to commands from the computer 22 to process the reflection signal into a feature vector representing physical characteristics of the targeted textured surface according to steps included in the method of our invention. In one embodiment, the feature vector generator 44 yields a feature vector that is substantially invariant under reversals of the scan direction (reflection invariant) and motions of the fruit along the scan direction (translation invariant).

A comparator 46 disposed at the output of the wavelet transformer 44 responds to commands from the computer 22 to compare the extracted feature vector from a predetermined set of feature vectors stored in the computer memory 24. Like the transformer, the comparator 46 is usually implemented as software inside the computer.

While the system of the present invention 20 may be assembled and implemented as a stand alone apparatus to detect unique produce surface features, e.g. texture, one implementation of the system, shown in FIG. 1, incorporates many elements of a conventional bar code design. In such an embodiment, a conventional bar code processor 50 is connected in parallel with the produce processor 40 to enable reading of both bar codes and produce surface textures with the same scanner. The bar code processor includes an input filter 52 to establish positive and negative thresholds on the intensity data emanating from the detector output and eliminate the data between the thresholds. The filter output feeds a conventional bar code decoder 54 that responds to commands from the computer 22 to interpret the detected thresholds into a product identification and price.

We have found that implementation of a conventional bar code scanner performs optimally when the input electronics are designed to introduce minimum noise, even at relatively low frequencies. Conventional techniques for minimizing input noise include matching the capacitance of the input amplifier to the photodetector 32, where the amplifier is an FET type. This often involves extremely large FETs or arrays of many in parallel. Another procedure utilizes an actively driven shield around the photodiode and input amplifier to improve high frequency response. Further, the stray wiring capacitance may be minimized by mounting the detector directly on the input electronics.

Figure 1A:
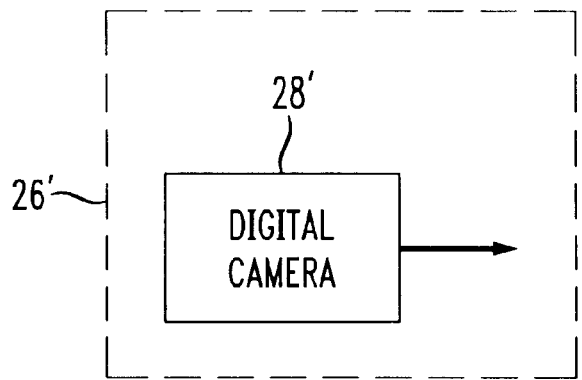
FIG. 1A is a block diagram illustrating an optical scanner according to an alternative embodiment of the system of the present invention.

In an alternative embodiment shown in FIG. 1A, an optical scanner 26' comprises a camera 28', such as a CCD camera or photodiode array. The image generated by the camera may be processed to simulate the scan pattern of a bar code scanner according to the method of the present invention.

In another alternative embodiment, the system may analyze previously stored data, such as a computer disk, tape, or region of semiconductor memory.

Operation of the system of the present invention is best described with reference to the method of the present invention, shown generally in FIG. 2. The method includes the steps of acquiring intensity data 62, deciding whether the data is bad at step 81 and then deciding whether the scanned volume is empty (i.e., is there an object being scanned?) at step 82. If in step 81 the data is determined to be unusable, an error condition is signaled at step 84. If there is no object in the scanned volume, i.e. the scanned volume is empty, estimates of the scattering and attenuation in the optical system 26 are calculated at step 86. Otherwise, the data is transformed to extract a physical feature vector at step 100 for comparison at step 140 with a predetermined set. This comparison determines the identity of the scanned object at step 160.

In accordance with an aspect of our invention, the intensity data acquisition step 62 resolves problems caused by the physical equipment used. During operation of the system, the round trip path of the laser beam 30 and a component of its reflected signal intersect a protective transparent window 36 twice before detection by the sensor 32. As a result, dirt and contamination on the window can wreak havoc on detected data unless compensated by an appropriate procedure.

Figure 3:
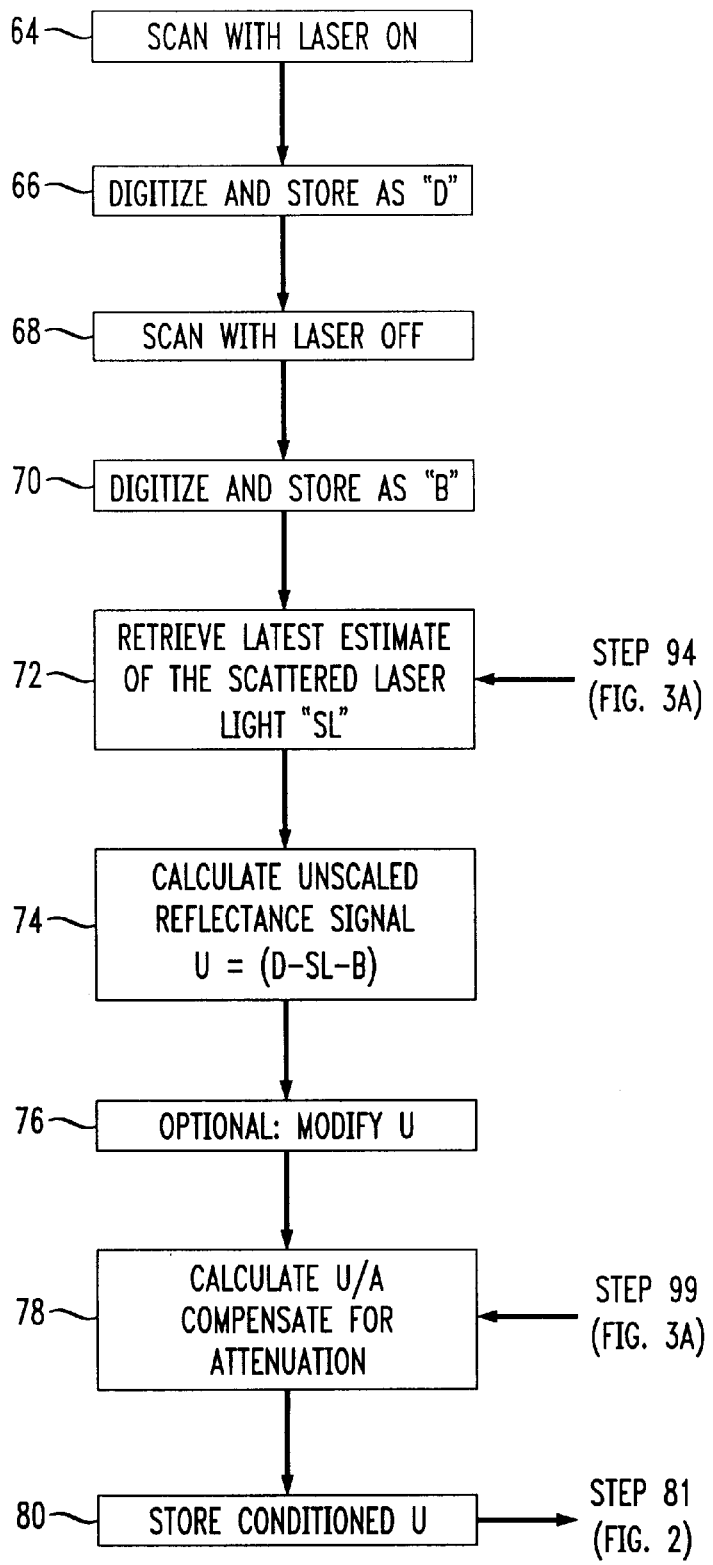
FIG. 3 is a flow chart of the steps included in the acquiring step according to one embodiment of the method shown in FIG. 2.

With particular reference to FIG. 3, the acquiring step 62 (FIG. 2) compensates for dirt contaminated data by incorporating the following procedure. First, as shown in step 64, the operator scans the textured surface 34 with the laser 30 on. Light reflections and background noise signals are detected by the detector 32, digitized and stored in the computer memory 24 as "D" at step 66. Next, as shown in step 68, the operator scans the textured surface with the laser off, so that the detector senses only ambient noise signals. The isolated ambient data is then digitized and stored in the memory as "B", at step 70.

In both steps 66 and 70, it is advantageous to determine during manufacture the parts of the data stream where the optical path is substantially obscured or otherwise compromised, and to mark such portions of the data with invalid data indications. In a typical rotating mirror bar code scanner, the laser beam will periodically fall between mirrors, or will be split by striking the edge where two mirrors touch. In such circumstances, data from these regions is marked as invalid. If an electronic camera (e.g., CCD or diode array) is used to acquire reflectance data instead of a bar code scanner, the defective pixels are identified during manufacture and marked as invalid.

Unless otherwise noted, arithmetic operations act as specified in IEEE standard 754-1985 ("IEEE Standard for binary floating point arithmetic"). Most importantly, data marked as invalid may be represented as the IEEE-754-1985 quantity "not a number" or "NaN". The most important aspect thereof specifies that any arithmetic operation involving invalid data yields invalid data, e.g., 3+NaN=NaN.

Figure 3A:
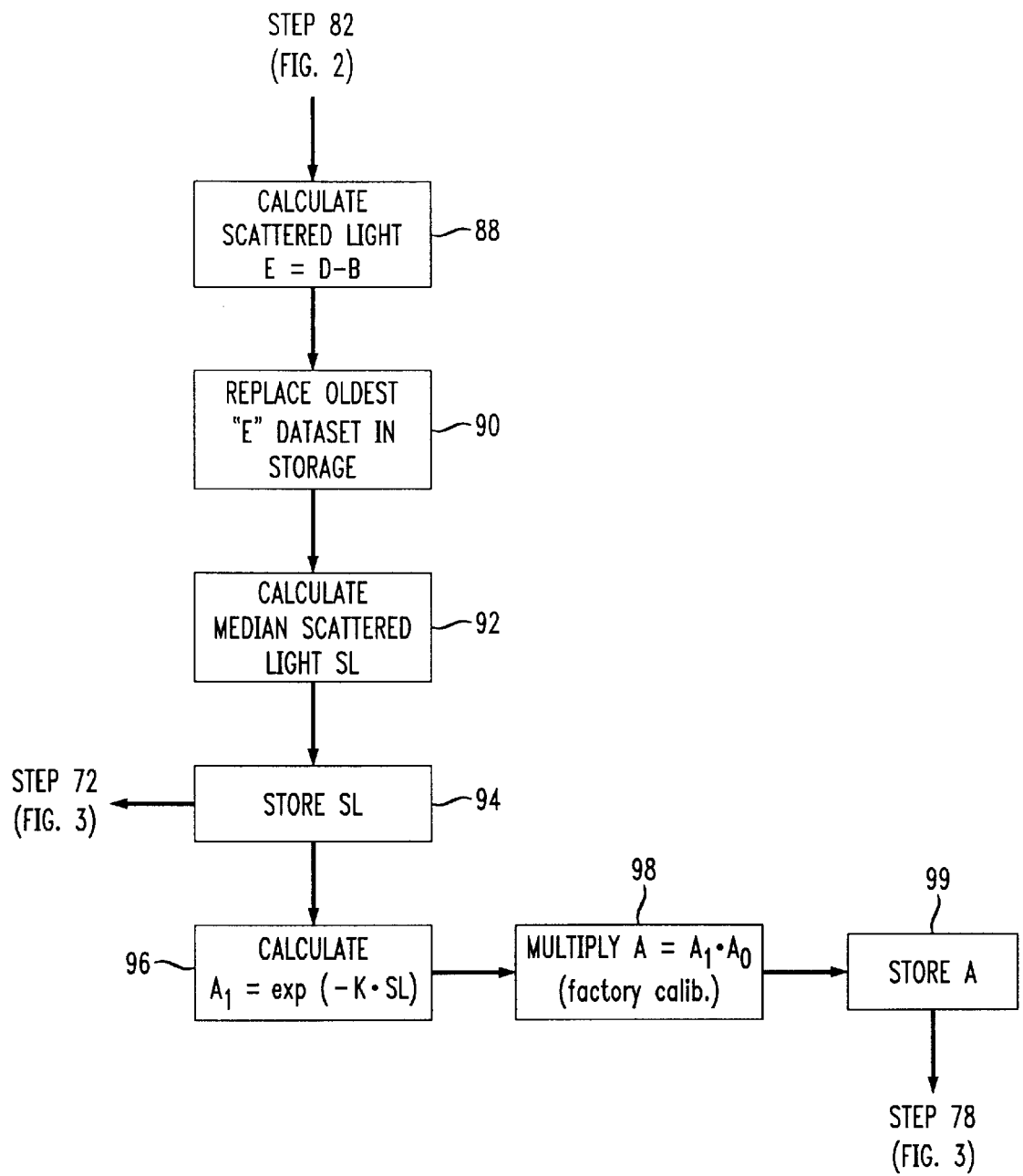
FIG. 3A is a flow chart of the steps involved in the estimating step according to one embodiment of the method shown in FIG. 2.

The method continues with the system identifying the latest estimate of the light scattered from the optical system, here labeled "SL" at step 72. This information is obtained from step 86 (FIG. 2) and step 94 (FIG. 3A). The unscaled reflectance signal, labeled "U", is calculated at step 74 by performing the substraction operation D−S−B. It is advantageous to modify U at step 76 by setting all negative components of U to "NaN" if they are more negative than a predefined threshold. The threshold is set approximately within the range of 1 and 100 times (preferably 3 and 30 times) the RMS noise of D−S−B under operational conditions with no produce in the scanned volume. Further, all negative values that do not exceed the threshold are advantageously set to zero.

Once subtraction of the ambient noise from the composite signal is complete, the resultant unscaled reflection signal is compensated at step 78 by an attenuation factor representing the signal that would be received from a perfect diffuse reflector. As shown in step 80, the resulting scaled reflection signal is retained for analysis.

Following the acquisition step 62, the system classifies the data as bad data or good data at step 81. Bad data results in an error indication at step 84. At step 82, the data is classified as "blank" data (no object present), which blank data is suitable for estimation of scattered light (s) and attenuation (A) at step 86 or to produce signal data for transformation at step 100.

The classification often involves many inputs. For example, a non-zero reading of a scale associated with the bar code reader implies that something is on the scanner, presumably within the scanned volume.

An input may also comprise the output from a photodiode measuring fluctuations in ambient light in the 0.3–3 Hz (for example) frequency band. Such fluctuations are commonly used to turn on bar code scanners, and are indicative of objects moving between the scanner and overhead lights, which are possibly in the scanned volume.

One other input includes the time since the last detected bar-code reading. Produce scans are often closely associated with purchases of other items. It is assumed that some object is within the scanned volume for 1–30 seconds before and after a bar code is detected.

The acquired data itself also serves as an input for the data classification step 82. If a predefined number of pixels have a scaled reflectivity greater than some predefined value, an object is assumed to be in the scanned volume. The number of pixels and the reflectivity threshold can be set by straightforward experimentation on a constructed system.

Anyone skilled in the programming art may construct a classification procedure comprising a heuristic algorithm as shown at step 82. For example, if any of the inputs report that there is an object in the scanned volume, control transfers to step 100. If none of the inputs report an object, control transfers to step 86.

If the data is determined to be bad in step 81, an error is indicated at step 84. The error may be indicated by a red light and tone to alert the operator. Alternatively, signals may be sent to other systems that might re-trigger the produce identification system. Such signals might also be logged, and used to inform the operator when the system has become too unreliable.

FIG. 3A illustrates the steps performed when the acquired data is classified as "blank" data at step 86 (FIG. 2). First, the scattered light "E" is calculated at step 88 according to the equation:

$$E = D - B$$

where D=the data acquired at step 66; and
B=the data acquired at step 70 (FIG. 3).

The quantity "E" comprises a dataset representing a measurement of excess light when the light source is on. Typically, the data from such measurements will be stored.

The method proceeds, at step 90, by removing one of the "E" datasets from the store. Typically, the dataset removed is the oldest "E" measurement. Next, the median scattered light denoted SL, is calculated, at step 92, and stored at step 94. The median value represents a median of all the E datasets taken at the same position of the rotating scanner mirror. Other estimates may also be used to arrive at a single output curve such as a plain average.

An important aspect of the method involves the application of the IEEE-754-1985 rules. During the median calculating step 92, all invalid data ("NaN") is ignored rather than marking the data as "invalid". Thus, the median of {NAN, 3, 5, NaN, 7} is the median of {3, 5, 7}. To minimize storage, a decaying average for the calculating step 92 can alternatively be implemented, with similar treatment of NaN.

Once SL is calculated, an attenuation factor, denoted "A", is derived at step 96. The derivation includes convolving S with a factory-defined kernel "K" according to the equation, $A_1 = \exp(-K \cdot S)$. The details of the optical system will govern the most suitable kernel. A typical kernel resembles the sum of two Gaussian distributions with widths corresponding to the outgoing and incoming light beams at the point of intersection with the window 36. The incoming beam is usually larger and often measures approximately 1 centimeter, which corresponds to approximately 100 pixels. The heights are typically determined by the color of common dirt; the weights (integral under the curve) of the two Gaussian components are typically similar.

Next, the factor "$A_1$", is modified, at step 98, by multiplying it by a factory-defined curve "$A_0$" to arrive at a final attenuation factor "A". $A_0$ represents the system response to a perfect diffuse reflector. If for some reason the value of "A" is below a certain predetermined threshold (typically in the range of 0.01–0.5 times the peak value of A), the pixels are set to "NaN". Similarly, A could be set to NaN if the value of A is less than a threshold (typically between 0.3–0.99). The value for A is then stored at step 99.

Figure 4:
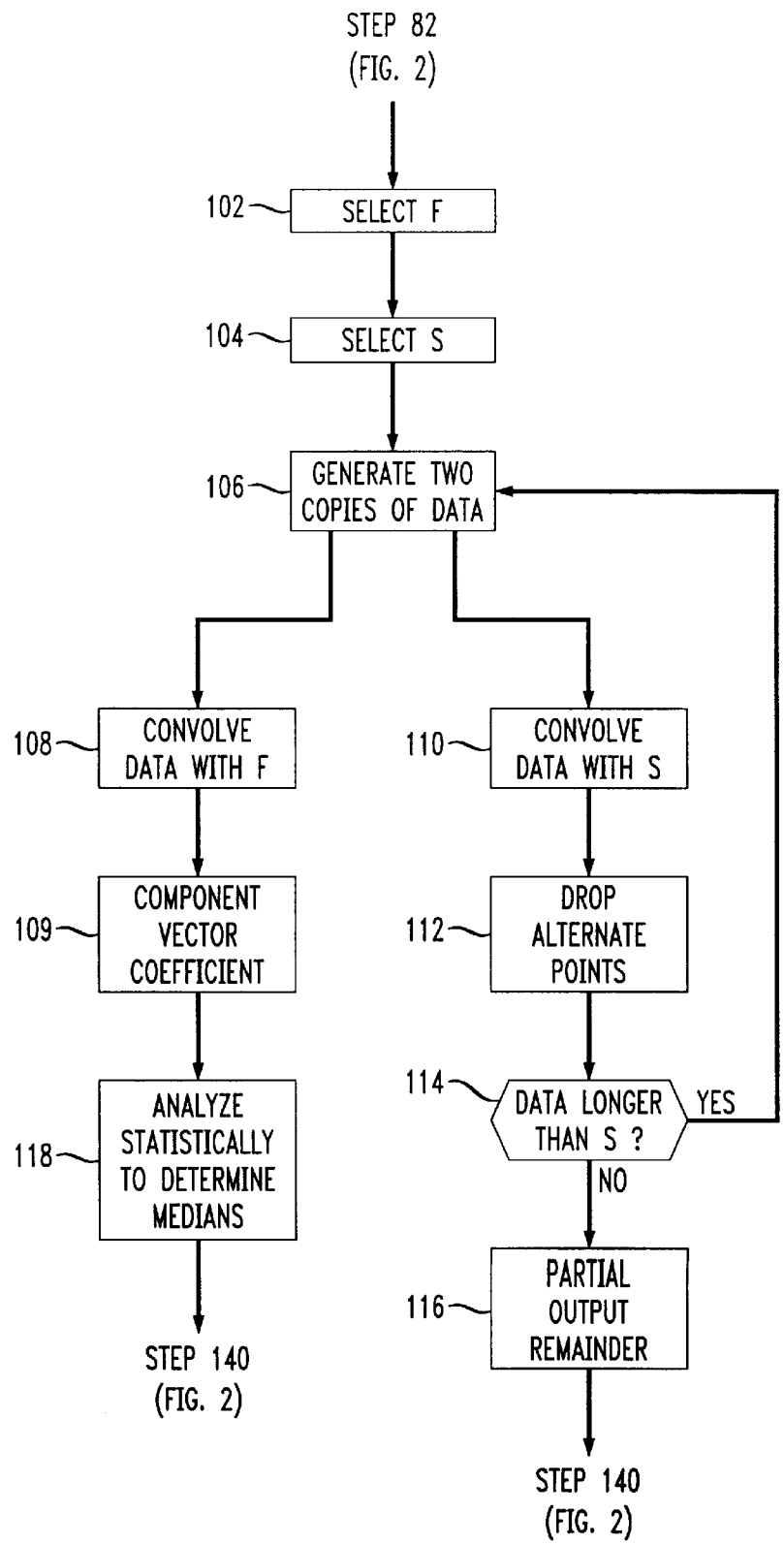
FIG. 4 is a flow chart illustrating the steps included in the transforming step according to one embodiment of the method shown in FIG. 2.

Referring now to FIGS. 2 and 4, data classified as produce signal data is transformed at step 100. In one embodiment, the transformation involves applying a modified wavelet transform to the acquired data to extract a physical feature vector comprising a plurality of vector components. The components have respective coefficients corresponding to at least one physical property representative of the textured surface.

The wavelet transform is a multi-step operation on a signal that decomposes the data into a plurality of windows characterized by smoothly varying components containing broad features (the low frequency component) and sharp features (the high frequency components).

The feature vector extraction process analyzes the intensity profiles of the data from the scanner to extract curvature on various length scales, roughness on various length scales, and possibly correlations between the roughness on neighboring length scales. Additionally, several miscellaneous measurements may be used as components of the feature vector: an overall reflectivity, and median absolute slope of the intensity vs. position. Other measures, such as median length of specular regions, number of specular regions, median length of a scanner slice across the fruit, may also be advantageously used. The heart of the algorithm is the modified wavelet transforms for extracting roughness, curvature, and correlations on different length scales.

With particular reference to FIG. 4, the steps involved in transforming the data into the wavelet domain include, as shown in steps 102 and 104, first selecting a pair of convolution kernels F and S; S is a smoothing kernel and F is chosen to retain the information that S removes. Information on suitable wavelet transforms may be found in U.S. Pat. No. 5,392,255 of LeBras et al. and the references cited therein, all of which are incorporated herein by references.

The transform continues at step 106, by providing two copies of the data, for convolving with both F and S. Respective convolutions of the data are then performed with F and S, at steps 108 and 110, respectively. The output of the convolution with F comprises a set of components of the wavelet transform at a specific scale as shown in step 109. The result of the convolution with S, shown at step 112, is modified by dropping every other data point (alternate points). If the resultant data from the modified convolution is longer than S, at step 114, a copy is made, at step 106, with the process iterating through the respective F and S convolution steps until the data becomes shorter than S. Once reduction is complete, the remainder is used as a partial output for the transform, at step 116.

We note that it may be advantageous to choose F and S such that F+S is nonzero at only a single point. In such a case, one of the convolutions can be replaced with a simple subtraction, e.g., DATA•F=DATA−DATA•S, this allows the wavelet transform to be completed with fewer operations.

Under these conditions, enough information is retained to reconstruct the original data. The result of convolving the data by F is the wavelet transform (at a given scale), and the result of convolution with S is a smoothed version of the data, which has half the number of data points. The data is then replaced with S convolved with the old data, and the process repeats. Finally, when the length of the data is shorter than the length of F or S, the remainder is used as part of the output.

In other words, the wavelet transform successively smooths the data, and at each smoothing step, the high-frequency components that would otherwise be lost are peeled off, and become the output of the transform. Each step produces an output vector that displays the wiggles of the data on successively larger length scales, after smoothing over a region that is 1, 2, 4, . . . pixels wide.

The above "classical" wavelet transform is modified in two ways for use in the present system. First, all the result of the convolutions with F are kept, rather than just alternate points. This allows the feature vector to be constructed to be invariant under translations of the object along the scan direction.

Second, the requirement for F is changed. In order to achieve the desired orthogonality for a standard wavelet transform, F is forced to be asymmetrical, often nearly becoming an odd function (i.e., $F(x)=-F(-x)$). However, according to the present invention, F is preferably an even function (i.e., $F(x)=F(-x)$), so that the feature vector will be invariant under 180 degree rotations of the fruit or reverses in the scan direction. We then choose S orthogonal to F, but F is no longer necessarily orthogonal to shifted versions of itself, nor is S. The end result is a set of output vectors that are insensitive to the average slope of the reflectivity along the scan direction, but are quite sensitive to the curvature. The requirement that S be orthogonal to F is there so that the transform yield a clean separation between the low and high frequency components.

A typical pair of kernels is $S=\{1, 2, 1\}$ and $F=\{-1, 2, -1\}$. These kernels emphasize spatial localization, but have a broad frequency range. Anyone skilled in the art could choose kernels that are more localized in frequency, if desired. Such a kernel would be longer, and F would typically contain several oscillations. It is also contemplated that scalings other than the classical wavelet transform's 2:1 ratio may be used. For instance, 3:2 could be achieved by finding five functions, $F_1, F_2, F_3, S_1, S_2$, where $F_i$ convolved with a constant is zero, the centroids of $S_i$ are separated by 5/2, $\Sigma S_1 = \Sigma S_2$, $\Sigma F_1^2 = \Sigma F_2^2 = \Sigma F_3^2$, $F_i$ is orthogonal to $S_j$. According to the present invention, $F_2$ is required to be even, and $F_1, F_3$ and $S_1, S_2$ must be even mirror pairs, with a common mirror point. However, we contemplate that for identification problems where the object to be identified has a preferred orientation, it may be advantageous not to impose mirror symmetry on the algorithm, and functions F and S need not be even.

In one embodiment of the method of the present invention, the wavelet transform is performed using IEEE-754 arithmetic, after all imperfect data are replaced by NaN ("Not a Number"). As disclosed earlier, in IEEE-754 arithmetic, the result of x+NaN is NaN, for all x. Thus, at any stage of the transform, any value that has been contaminated by imperfect data has the value NaN. For example, a datum may be declared imperfect if, for instance, the photodetector of the scanner saturates from sunlight or a fluorescent light source.

Before the extracted feature vector is further processed, its individual components are first adjusted. This step makes the components independent of one another and as close to Gaussian distributions as possible. Moreover, it is convenient to make the widths of the distributions comparable. First, the curvature and roughness measurements are divided by the median intensity. For convenience, they are then typically multiplied by constants chosen to make their respective responses to Gaussian 1/f noise equal. Correlations are divided by the intensity squared, and also adjusted for 1/f noise. Likewise, the median absolute slope is divided by the median intensity and multiplied by the length of that slice of data. A natural log is taken of the median intensity, and used as the overall reflectivity. Further, the square root is taken of the median length, the number of specular regions and the median length of a scanner slice across the fruit.

Each component vector of the wavelet transform output (i.e. the vectors $F_x, FS_x, FSS_x, FSSS_x \ldots$) is then analyzed statistically, at step 118, to determine median or other similar robust measures of the center of the distribution of values. The values represent probabilities for physical properties characteristic of the surface, e.g. texture. In one embodiment, determinations of curvature, roughness, and correlations therebetween on different scales are made.

Figure 5:
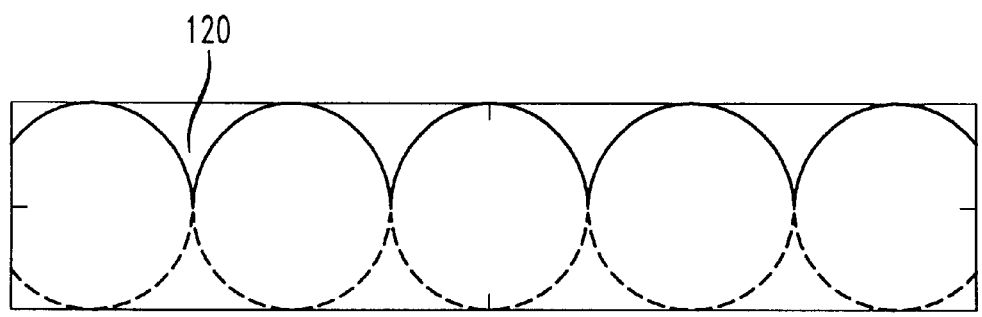
FIG. 5 is an elevated cross-sectional view of a collection of grapes arranged in a horizontally adjacent position.
Figure 6:
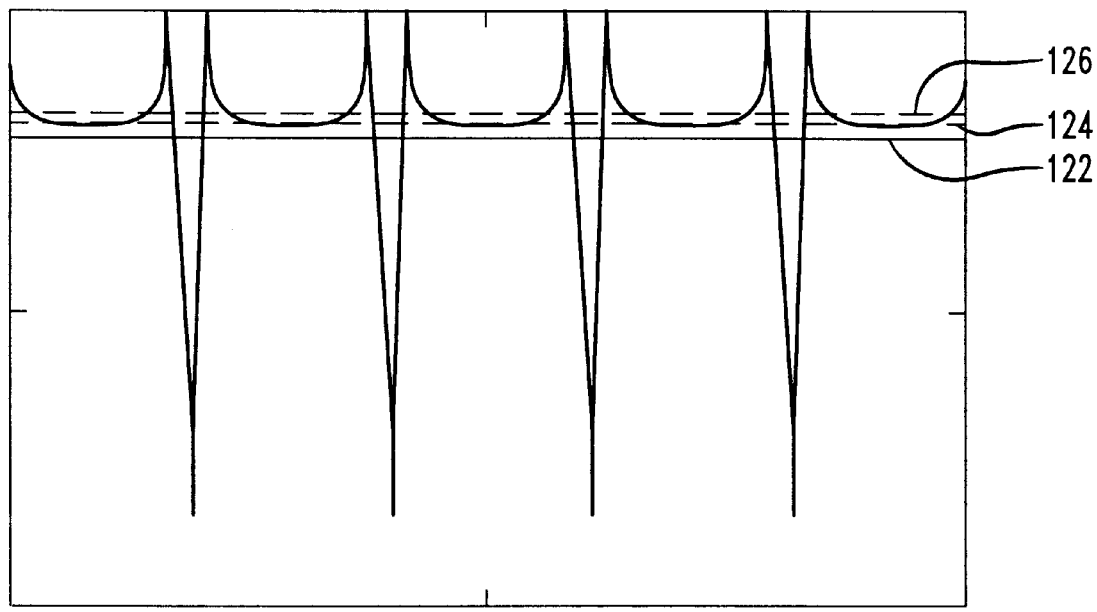
FIG. 6 is a graphical representation of curvature versus position in the wavelet domain for the grapes shown in FIG. 5.

To calculate curvature, we have discovered that utilizing a robust estimator rather than a straight average is crucial to avoid errors in measurements attributable to cusps 120 (FIG. 5) between adjacent fruits or vegetables. FIG. 5 illustrates a cross section of a collection of grapes showing the approximate locations of a plurality of cusps. FIG. 6 shows the curvature of the grapes on a scale of 10 pixels representing 0.1 times the diameter of the grape. The large negative and positive spikes occur when the non-zero parts of the kernel (−1,0,0,0,0,0,0,0,0,0, 2,0,0,0,0,0,0,0,0,−1) go over the cusps between the grapes. Further, referring to FIG. 6, line 122 represents zero curvature, while lines 124 and 126 represent the 25th and 75th percentiles of the curvature distribution. The median curvature lies between lines 124 and 126 and approximates the inverse of the grape radius. The average curvature is exactly zero.

The median curvature calculation depends on the scale used. It approaches zero if calculated on a scale larger than one grape. The median curvature may be measured on scales much smaller than one grape, but fine ripples along the surface would swamp the curvature data. Generally, the measured median curvature shows the effects of roughness on all larger length scales. The statistics on curvature reflect information on the individual grape sizes by identifying the contribution to the curvature and indicating the length scale at which the curvature decreases toward zero.

Figure 7:
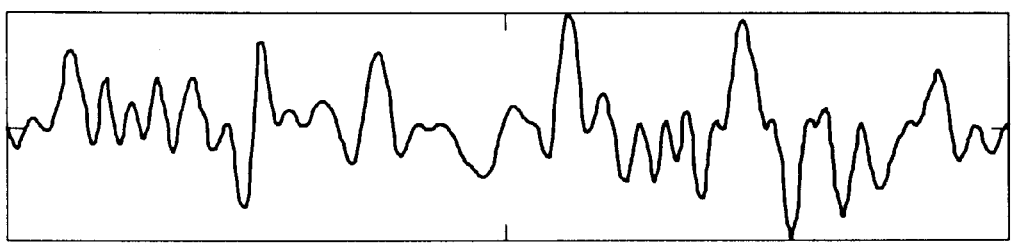
FIG. 7 is an enlarged view of the surface of a grape along detail 7 of FIG. 5.
Figure 8:
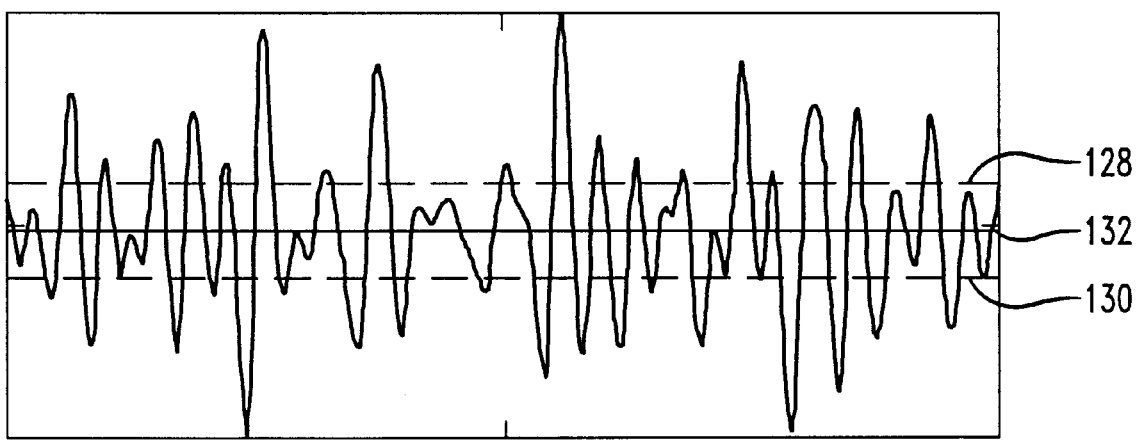
FIG. 8 is a graphical representation of roughness versus position in the wavelet domain for the grape surface shown in FIG. 7.

Another statistic in the feature vector can be a measure of the width of the distribution of curvature calculated for each length scale. The roughness statistic handles the large class of surfaces that are rough, but rough in an approximately symmetrical manner. FIG. 7 illustrates an enlarged cross section of a random rough surface. FIG. 8 illustrates simulated roughness data comprising a sum of six sine waves of equal amplitude and different frequencies in the wavelet domain corresponding to the surface of FIG. 7. Lines 128 and 130 identify the respective 25th and 75th percentiles of the curvature. A suitable statistic is the difference between the percentiles, comprising the median absolute deviation. Line 132 shows the median curvature here, which is nearly zero.

The feature vector may also be analyzed statistically for correlations between different length scales. If ripples on different length scales are correlated, the surface tends to be sharp and spiky. If left uncorrelated, the surface resembles Gaussian noise. Typically the correlation may be calculated as the median of the product of corresponding wavelet coefficients. Usually, four (4) correlations are calculated between each pair of length scales by shifting one of the transformed datasets against the other. Only adjacent scales (differing by a factor of two) are compared because such correlations are larger than correlations between more disparate length scales. However, the invention contemplates correlating all scales if desired.

The correlations of remote scales, however, are of questionable usefulness since there are a lot of them. With a typical scan line being 500 pixels long, there are 8 passes through the wavelet transform. Thus, there are 28 numbers to add to the feature vector. If shifted correlations are included, there are upwards of a thousand different statistics that could be added to the feature vector. This results in a large cost in computation time and memory. More importantly, the required size of the training set becomes large. Several times as many training data are needed, per type of fruit, as there are elements in the feature vector. With, say, one hundred (100) elements in the feature vector, and over 100 types of produce in a typical supermarket, calibrating the identifier could take several tons of fruit.

Referring back to FIG. 1, once the wavelet processor 44 completes extraction and statistical processing of the feature vector, the comparator 46 compares the extracted vector, at step 140 (FIG. 2), to a set of vectors stored in the computer memory 24 and establishes a classification or match. The predetermined set of vectors comprises a produce database created by taking multiple "training" measurements of each kind of expected fruit and vegetable and applying the acquiring and transforming steps 62 and 100 described above to each. Because each feature vector represents a single point in multidimensional space, the closest training point on the dataset to the extracted point serves as a "match" to identify the produce. We have found that in some cases, the preferred matching technique involves relating the extracted point to the collection of five or six points that are closest to it and ranking them by probability or using them in combination with another type of test, (e.g., spectroscopic identification) to make a final determination. A probability could be calculated for each type of produce by summing a function of the distance (typically something like $e^{-dad}$, where d is the distance, and q is a constant) over each point, and then reporting the largest few probabilities. We contemplate using a nonnegative definite matrix for q, in place of a scalar constant. Such a matrix would be preferable if the typical distribution of training points were an elongated ellipsoid.

In approximately 1% of the training points, the produce is moving too rapidly when scanned, or the hand of a clerk holding the produce is accidentally scanned, instead of the produce itself. In order to recognize fruit, rather than fingers, the covariance matrix (thus the linear transform) is calculated, then the 1% of points with the largest distance from the center of the distribution are eliminated. Empirically, this was determined to be effective in eliminating most contaminated training points. However, it would be unnecessary and undesirable if there were no contaminated points.

It is good to continue scanning and processing data as long as something is in front of the scanner. In the preferred method, data acquisition begins as soon as weight is placed on a weighing scale built into the bar code scanner (even before the scale has stabilized), and uses a matching algorithm that produces probabilities for all produce. As each set of probabilities is produced, they are normalized (to sum to unity) and combined with a decaying average into an overall probability vector. An equivalent decaying average of the squares of the probabilities is maintained, so that a variance estimate for each of the probabilities can be calculated. After a certain minimum number of measurements, the algorithm indicates success if the sum of the variances becomes sufficiently small. After a certain maximum number of measurements, if the sum of the variances is not small enough, the algorithm indicates failure so that the produce can be moved or rotated. Similar means of detecting if and when the measurements have produced a stable result can be derived by those skilled in the art. In a complete system, success or failure would be indicated by distinctive beeps and green or red lights. In the case of success, the system would display the names of the produce with the three largest probabilities and allow the operator to select one.

In the system, the clerk's hands must be treated as a special case. The training set must include a number of different views of hands, each view treated as a separate type of produce (e.g., palm down, palm up, fist, . . . ) and possibly several different skin tones, too. Special treatment for hands involves dropping all varieties of produce from the list that are less probable than hands. If too large a fraction of the measurements are likely to be hands, then the algorithm will indicate failure and display an appropriate message.

Following the comparing step 140, the computer 22 at step 160 directs a monitor or display 56 (FIG. 1) to identify the produce by the specific matched type, or identify the group of fruits or vegetables closest to the scanned produce for the checker to make the final determination. Once final identification is complete, the weight of the produce is determined, and the correct price calculated.

We have found it advantageous for the image subtraction to be done synchronously with the powerline frequency by using the phase locking circuitry 27 to change the mirror rotation frequency of standard scanners so it is approximately 30 HZ, 60 Hz, 120 HZ, or 180 Hz. One of the major sources of interference in a grocery store environment comprises fluorescent lighting. Fluorescent lights have a 10–20% intensity modulation at 120 Hz and somewhat less at other harmonics of 60 Hz. We have found it desirable to subtract pixels from the same phase of a 60 Hz power line cycle.

Figure 1B:
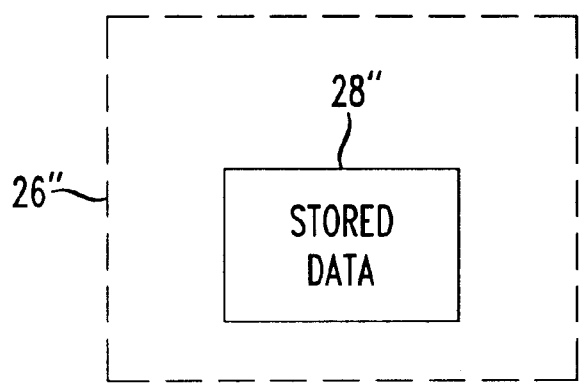
FIG. 1B illustrates using the system on a stored image, as an alternative embodiment.

In an alternative embodiment of the method of the present invention, the scan pattern of the bar code scanner is simulated by a digital camera 28', shown in FIG. 1A. The simulation includes the steps of extracting linear stripes of pixels from the image, and concatenating them together. The stripes are typically 1–3 pixels wide, 100–2000 pixels long, and oriented in several different directions. This renders the feature vector less dependent on the orientation of the produce. In another alternative embodiment, a previously prepared image is the source of the data. Stripes are extracted from the image stored in 28" (FIG. 1B) as above. Several images may be used, corresponding to laser on, laser off, produce and no produce states. In many cases, the signal conditioning (42) may become trivial, as the images 28" may either be previously conditioned, may be of sufficient quality that conditioning be nonessential, or they may be drawn, painted or computed so that conditioning be inappropriate.

The system needs to be able to do a pixel substraction of scans taken with the laser "on" and scans taken with the laser "off". This requires that the laser be switchable on and off. It also requires that pixels match over a few successive scans. Matching pixels is most easily accomplished by controlling the speed of the scanning motor. Our demonstration system used 32768 pixels per rotation of the scanning motor, or about 1,000 pixels on each slice across the produce. This kind of resolution is appropriate to the length of each slice (typically 15 cm) and the resolution of the scanner (roughly 150 μm). This requires about 15 ppm stability of the motor speed across the 10 ms interval between successive scans.

Similarly, good long-term amplitude stability is important for the present invention, but not important in current bar code scanners. The most important single component of the feature vector is the average reflectivity. The measured reflectivity will be compared to a database of produce, and it is important that the calibration not change by more than the scatter in the reflectivity of any particular produce over the life of the device (i.e., 10% over 5 years). This may require a photodiode to monitor the laser output, or a white calibration patch inside the scanner that the beam scans over once per revolution.

It may be necessary in order to achieve sufficient stability of the feature vector over years, to supply a calibration target that can be stored carefully in an envelope somewhere, and used every few months. Something very stable, like a white Teflon sheet could be a good reflectivity standard and would be easy to keep clean. Fancier targets could also have known textures (or known distributions of black spots) that could also tell if the resolution of the sensor were changing with time.

A second version of background subtraction may be used to reduce the effect of dirt on the window 36. Dirt on the window will strongly scatter laser light back into the photodetector, since the dirt is closer than the target. Given an image of the scattering, it is used two ways to correct the data. First, it is subtracted off the (already background subtracted) data. Second, it is used to estimate the attenuation in the light that makes it through the dirty window, hits the fruit, and returns through the dirty window. The data is then divided by the attenuation factor to calculate the amount of light that would have been detected had the window been clean.

The light scattered from the window is estimated by occasionally acquiring data when it is likely that no large objects are in front of the scanner, and then making appropriate combinations of several such scans. For this purpose, scans would be taken after some period (e.g., 1 minute) of inactivity (existing bar code scanners have means to detect when nothing is going on, e.g., the weight on the scale is monitored, as is the output of the photodetector). Such scans would only be used if they were also followed by a suitable period of inactivity. Given several suitable scans, they are combined by an algorithm that reports the most-probable value per pixel, with more emphasis to dimmer readings (as bright readings are likely to be caused by reflection off some nearby object).

Two classes of suitable algorithms are as follows: first, one can apply a Bayesean or maximum-likelihood estimator to the typical pixel brightness, on the assumption that pixels are occasionally contaminated by large amounts of extra brightness (i.e., some nearby moving reflective object like a hand). This amounts to assuming that the noise of each measurement is roughly Gaussian, but has an extremely extended tail in the high brightness direction. The total weight of the tail (its integral) is the probability that an object will be in view of the scanner (e.g., 10%), and the tail should extend to the maximum brightness measurement by the scanner.

The other class of algorithms are heuristic modifications of medians. Simply taking the median of the various scans will work reasonably well, so long as most of the scans are mostly empty. However, the rejection of spurious objects can be improved by rejecting measurements that are substantially brighter than the median (and then repeating, until a self-consistent solution is found). On the other hand, if spurious objects are not excessively common, the noise of the estimate can be reduced by using a hybrid of a mean and a median (e.g., one averages the data between the $25^{th}$ and $75^{th}$ percentiles). It may be advantageous to use both modifications to the simple median.

Another variation of the method of the present invention involves operating the identification system at several wavelengths. Data acquisition would occur by taking alternate scans with a plurality of lasers. Equivalently, a color CCD camera may be used to acquire three images of the produce in different colors.

Data acquisition may also be performed by using several illumination conditions. In the case of the CCD camera, it is relatively straightforward to arrange two or more light sources, one illuminating, for example, from a large ring around the camera (for mechanical roughness sensitivity suppression). The other source(s) may comprise point sources away from the camera, to enhance the sensitivity to rough surfaces.

A convenient way to establish two different illumination conditions is to utilize two polarizations of the light source. One could illuminate the sample with (for example) left and right circularly polarized light. The detector, being sensitive to (for example) left circular polarization, would thus distinguish reflections that preserve polarization from those that do not. The alternate illumination could be accomplished in several ways: two lasers with opposite polarization could be used, one laser and a Ken-effect cell, or by the placement of polarization-altering films on the several rotating mirrors of a mechanical scanner.

In all cases where multiple measurements are taken per pixel, each of the multiple measurements are carried through the acquiring step 62 independently. At the end of the acquiring step, various combinations of the measurements at each pixel may be calculated. For example, left-circularly-polarized data may be subtracted and added to right-circularly-polarized data. Additionally, data taken with a broad light source may be subtracted and added to data taken with a point light source. Another combination includes subtracting and adding red reflectivity from blue reflectivity. In each case, the directed emphasis is to produce relatively independent combinations.

Following data acquisition, produce signal data proceeds through the wavelet transformation steps where each combination is treated separately. Construction of the feature vector comprises arranging the components in order to yield a feature vector that is substantially larger. For example, with two measurements per pixel, the feature vector would be twice as large. However, the comparison step would proceed normally.

Another alternative embodiment of the method of the present invention involves taking multiple scans of the object being identified. This may be desirable to reduce noise in the system. Equivalent pixels on the different scans are identified, with the multiple datasets for each given pixel processed separately up until calculation of the feature vector. Rather than concatenating the multiple processed measurements together to form a long feature vector, the average or median measurement may be calculated for all the equivalent components. This yields a feature vector of the same length as if only a single scan had been taken, but with a smaller variance.

While produce identification is an important application for the system and method of the present invention, we anticipate many other useful applications as well. For example, given a suitable database of feature vectors, the system may be used for identifying sexually explicit images. This would prevent a television or Internet web site browser from displaying undesirable content.

Figure 9:
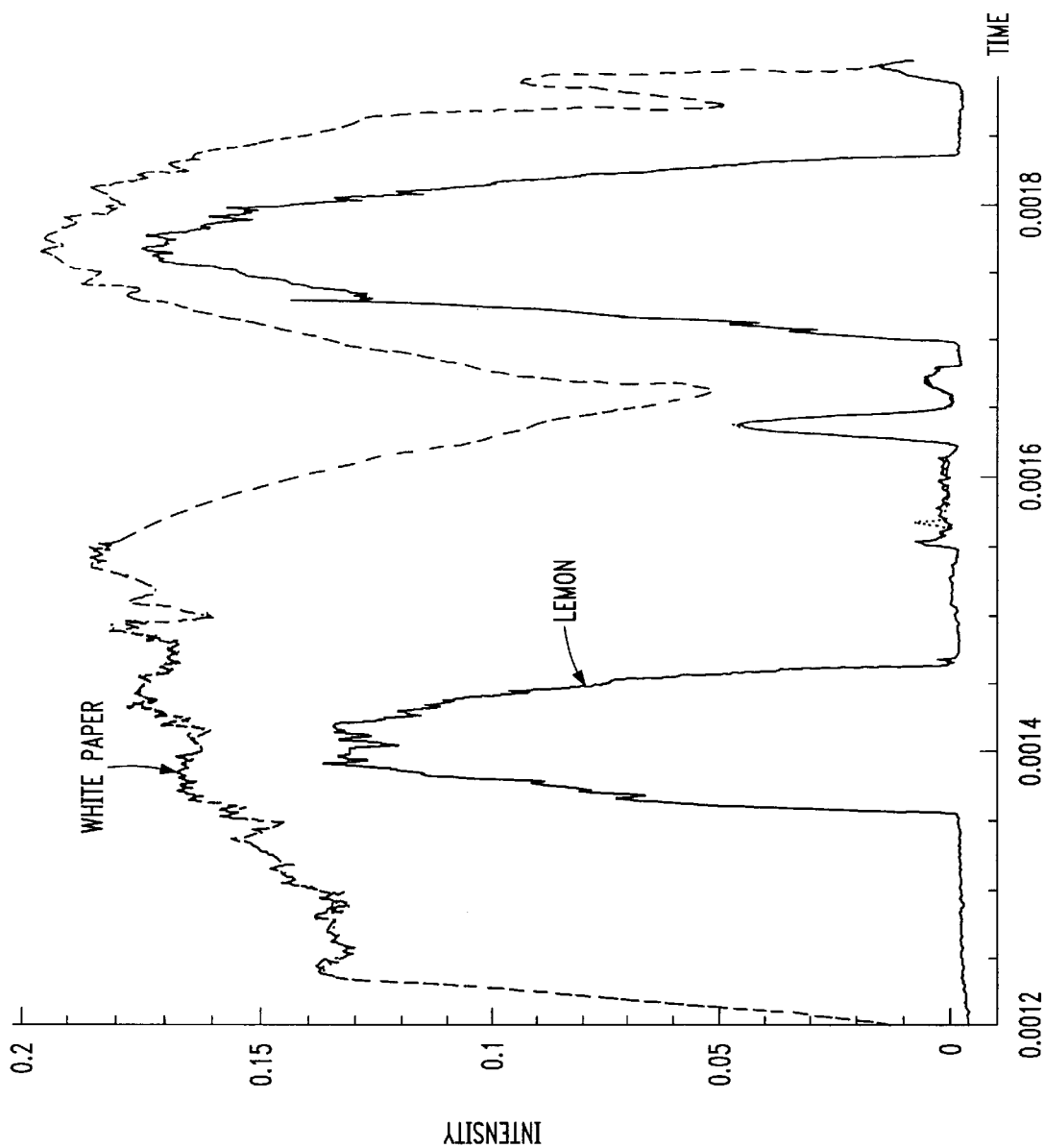
FIG. 9 is a graphical representation of the intensity profile of a lemon.
Figure 10:
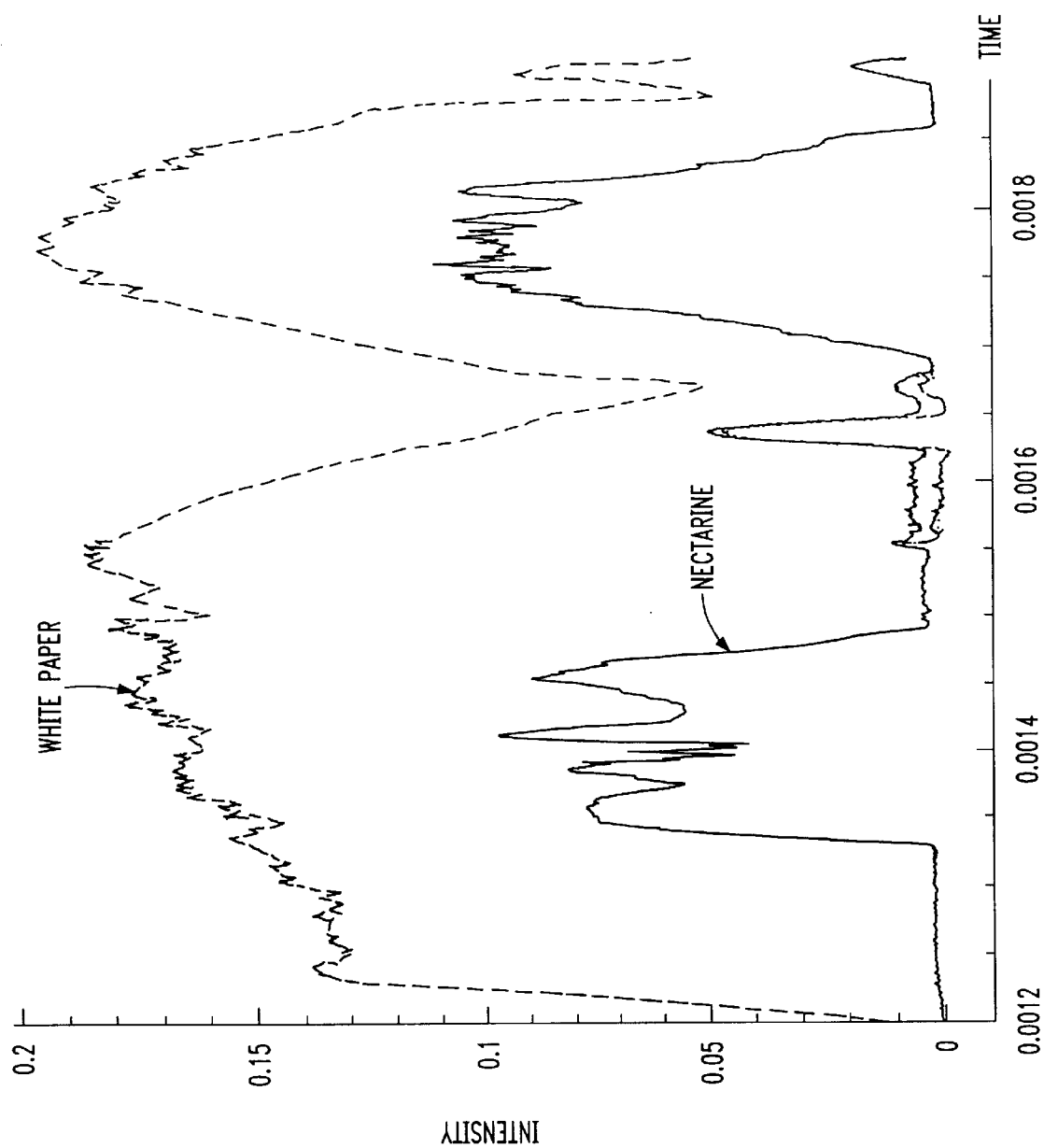
FIG. 10 is a graphical representation of the intensity profile of a nectarine.

Sample intensity profiles of a lemon and a nectarine are shown in FIGS. 9 and 10. The fruit data is shown by the solid line compared to a scan of white paper which is shown by the dots. These are small sections of the complete scan, showing two passes of the laser across different parts of the fruit. The lemon and nectarine data come from the same part of the scan and can be directly compared. Differences in the texture are visible—nectarines have more large scale structure and have an overall lower reflectivity than lemons. Identification results, using a close approximation to the preferred implementation are accurate between 80 and 98% of the time.

The system and method of the present invention may also be utilized to search databases of images to find images visually similar to a predetermined image. For instance, an owner of a copyrighted image could automatically search the Internet for unauthorized copies of the copyrighted image. Other uses include classification of aerial photographs of forests by predominant tree type, soil conditions from photographs of a lawn, measurements of the freshness of produce, finger prints and retinal images. In each case, a database of reference feature vectors is generated and labeled by the desired property to be measured.

In the case of produce, the system can determine more than the type. For example, bananas could be scanned several times, and labeled "green", "ripe", "overripe", and "rotten". The system would then discriminate between various freshness grades and charge customers accordingly, based on differences in the reflected color (i.e. green for green fruit and yellow for ripe fruit) as well as different textures.

Those skilled in the art will appreciate the cost reductions afforded by the system and method of the present invention. The capability of recognizing the surface of an article of produce using a bar code scanner eliminates the need to apply individual bar code labels on numerous quantities of fruits and vegetables. Not only does this reduce labor costs for the labels alone, but scanning errors from misread labels are also significantly abated.

Implementation of the modified wavelet transform will also be appreciated by those skilled in the art due to the translation invariant nature of the extracted feature vector. The translation invariance capability results from the step of selecting an even function for F and utilizing every convolution output of F to form the feature vector. Thus, scans taken on an item of produce will generate data equivalent to scans taken, for example, on the same produce, rotated differently. Another important aspect is the use of robust estimators, such as the median, in the generation of the feature vector. Aside from making the feature vector less sensitive to occasional errant data, it allows good measurements of the typical curvature (equivalent to the radius or size) of the produce, and surface roughness. With a robust estimator, curvature and roughness measurements give consistent results, independent of how many items are in the scanned volume and how they are arranged.

The system and method of the present invention also serve to improve customer satisfaction. For example, delays in checkout times are dramatically reduced because of the elimination of manual procedures involving look-up tables and register keying of price data. Additionally, upon leaving the supermarket and returning home, the consumer can count on higher quality produce untainted by surface marring bar code labels.

While the invention has been particularly shown and described with reference to the preferred embodiments thereof, it will be understood by those skilled in the art that various changes in form and detail may be made therein without departing from the spirit and scope of the invention.

What is claimed is:

1. An identification system for classifying an image defined by data stored in a computer memory and having respective physical surface properties, said system including:
   an optical scanner responsive to said computer, a window exposed to the environment through which a beam of light projects on to a surface of an object to be scanned, said scanner directing said beam oflight over said surface and receiving light reflected from said surface, said reflected light being converted by said scanner to a data signal representative of said surface, said scanner further including:
      a detector which determines scattered light data for said window by acquiring at least one scan of said window in the absence of said object to be scanned; and
      a conditioner which conditions said data signal representative of said object surface based on recording 3 or more levels of brightness for said window scan to compensate for said scattered light data;
   a wavelet processor receiving the data signal from said optical scanner and extracting a feature vector signal therefrom that includes a plurality of vector components having respective coefficients corresponding to at least one physical property representative ofsaid surface; and
   a comparator receiving the extracted feature vector signal from said wavelet processor, said comparator comparing said extracted feature vector signal with a set of predetermined feature vector signals stored in said memory and representing a plurality of object types, said comparator determining whether said object has a surface similar to the surface represented by any one of the predetermined vector signals included in said set based on the comparison.

2. An identification system according to claim 1 wherein:
   said optical scanner includes an optical source to generate a laser beam of a predetermined wavelength for scanning over said surface and producing reflected intensity data representative of said surface; and
   an optical signal detector for sensing the reflections of said beam incident on said surface.

3. An identification system according to claim 2 wherein said physical surface properties include surface texture.

4. An identification system according to claim 2 wherein said physical surface properties include at least one of curvature, color, mechanical roughness, and reflectivity in one or more directions.

5. An identification system according to claim 1 wherein said predetermined vector signals represent one of the color and condition of a single type of object.

6. An identification system according to claim 2 and further including means for generating multiple polarizations of said laser beam.

7. An identification system according to claim 2 wherein:
   said laser beam generating optical source is of the switchable type;

said detector is operable in response to said switchable source to scan across said surface with said beam turned on to collect composite intensity data defining a first scan, and to scan across said surface with said beam turned off to collect ambient intensity data defining a second scan; and said scanner includes a subtraction circuit which receives said ambient intensity data and subtracts it from said composite intensity data to generate filtered spectral reflectivity data.

8. An identification system according to claim 7 wherein said scanner includes a conditioner circuit which conditions said filtered data to compensate for scattering and attenuation of said laser beam by defects in said window.

9. A produce identification system according to claim 8 wherein said conditioner circuit includes:
   a detector which determines scattered light data in said filtered data resulting from said defects;
   a subtraction circuit which subtracts said scattered light data from said filtered data;
   an estimator which estimates an attenuation factor from said subtracted scattered light data; and
   a divider which divides said filtered data by said attenuation factor.

10. An identification system according to claim 1 further including a phase lock loop circuit to adjust said scanner frequency to a power line frequency so as to minimize power line interference.

11. An identification system according to claim 1 wherein said light has a wavelength of at least one of approximately 575 and 775 nanometers.

12. An identification system according to claim 1 wherein said optical scanner comprises a digital camera.

13. An identification system according to claim 12 and further including a plurality of switchable illumination sources.

14. A produce identification system for classifying an article of produce having respective physical textured surface properties, said system including:
   a computer having a memory;
   a bar code scanner responsive to said computer, said scanner having an optical source to generate a laser beam of a predetermined wavelength for scanning at a predetermined frequency over said textured surface and producing a one-dimensional stripe of reflected intensity data representative of the surface of an article of produce, and an optical signal detector for sensing the reflections of said beam incident on said surface;
   a phase locking circuit to adjust said predetermined scanner frequency to a predetermined power line frequency;
   a wavelet processor disposed at the output of said optical scanner to receive said one-dimensional stripe of reflected intensity data and extract a translation invariant feature vector comprising a plurality of vector components having respective coefficients corresponding to at least one physical property representative of a texture of the surface; and
   a comparator coupled to the output of said wavelet processor for comparing said extracted feature vector to a set of predetermined feature vectors stored in said memory and representing the textures of a plurality of produce types to determine whether the article has a texture similar to any one or more of the textures represented by the predetermined vectors included in said set.

15. A method of classifying image data representing particular physical surface properties of a surface of an object, said method including the steps of:
   acquiring data representative of said surface with a scanner having an output coupled to a computer;
   acquiring at least one scan by said scanner by means of a window exposed to the environment through which a beam of light from said scanner projects in the absence of said object;
   determining scattered light data from said window based on said scan;
   conditioning said data based on recording 3 or more levels of brightness for said window scan to compensate for said scattered light data;
   transforming said data to extract a physical feature vector comprising a plurality of vector components having respective coefficients corresponding to at least one physical property representative of said surface; and
   comparing said extracted feature vector to a set of predetermined feature vectors representing a plurality of objects to determine whether said article has a surface similar to the surface represented by any one of said predetermined vectors included in said set.

16. A method according to claim 15 wherein said acquiring step includes acquiring image data representative of said surface by a digital camera.

17. A method according to claim 15 wherein said acquiring step includes acquiring intensity data from reflections generated by a bar code scanner having a laser beam source and an optical signal detector.

18. A method according to claim 15 wherein said object has a textured surface and said acquiring step includes the steps of:
   first scanning said textured surface with said laser beam source to generate reflections from said textured surface;
   second scanning said textured surface with an optical signal detector substantially coincident with said laser beam source and sensing reflected optical signals, including reflections; and
   generating data representative of said reflections.

19. A method according to claim 18 wherein:
   said first scanning step includes sweeping said laser beam source across said textured surface with said beam turned on to define a first scan, then directing said signal detector across said textured surface with said beam turned off to define a second scan which defines ambient optical signals;
   said sensing step includes detecting a composite optical signal from said first scan including said reflections and said ambient optical signals and identifying an isolated background signal from said second scan including said ambient signal; and
   said generating step includes subtracting said background signal from said composite signal to form an unscaled reflection signal.

20. A method according to claim 19 wherein said generating step includes the step of:
   conditioning said unscaled reflection signal by a final attenuation factor to compensate for dirt attenuation; and
   storing said conditioned signal.

21. A method according to claim 20 wherein said conditioning step includes the steps of:
   maintaining a database history of scattered light datasets including a plurality of previously measured scattered light values and an oldest dataset;

calculating a real-time value of scattered light data resulting from said dirt;

replacing the oldest scattered light dataset with said real-time dataset in said database;

creating a modified scattered light dataset by considering said database history of scattered light datasets;

convolving said modified dataset by a predetermined kernel to generate a first attenuation factor; and modifying said first attenuation factor by a predetermined attenuation factor to derive a final attenuation factor.

22. A method according to claim 21 wherein said creating step includes calculating a median scattered light dataset from said plurality of datasets in said database.

23. A method according to claim 21 wherein said creating step includes the steps of calculating an average scattered light dataset from said plurality of datasets in said database.

24. A method according to claim 19 wherein said subtracting step includes:

identifying a power line having a power line frequency; and locking said scanner frequency to said power line frequency to synchronize the respective phases between said scanner frequency and said power line frequency.

25. A method according to claim 15 wherein said transforming step includes applying a modified wavelet transform to said data through respective iterative convolutions of a zero-mean even wiggly function whose mean is zero, and which has the property $f(-x)=f(+x)$, where $f(x)$ is nonzero at one or more points and a smoothing function derived from said wiggly function and orthogonal thereto, and wherein all of said convolutions with said wiggly function are retained to extract said feature vector and to provide translational invariance and reflection invariance.

26. A method according to claim 17 wherein said laser beam has a wavelength of at least one of approximately 575 and 775 nanometers.

27. A method according to claim 15 wherein said transforming step includes analyzing statistically said plurality of vector components to determine robust estimates of the physical surface properties.

28. A method according to claim 27 wherein said analyzing step includes determining the robust estimate for the curvature of at least one vector component using a median operation.

29. A method according to claim 27 wherein said analyzing step includes determining the robust estimate for the roughness of at least one vector component using a median operation.

30. A method according to claim 27 wherein said analyzing step includes determining one or more correlations between said respective physical properties.

31. A method according to claim 15 wherein said comparing step includes:

determining the closest predetermined vector to said extracted feature vector; and identifying said article as an item of produce represented by said closest predetermined vector.

32. A method according to claim 15 wherein said comparing step includes:

determining a plurality of similar predetermined vectors to said extracted feature vector; and identifying said article as similar to the group of articles represented by said plurality of similar predetermined vectors.

33. A method of using a bar code scanner to classify an article of produce in a grocery checkout line, said produce having an identifiable surface texture including a plurality of physical texture properties, said bar code scanner having an optical beam and a photodetector for sensing reflected components of said beam, said method including the steps of:

scanning said surface texture with said optical beam to generate reflections from said textured surface;

sensing optical signals including said reflections with said detector;

generating data representative of said reflections;

applying a modified wave let transform to said data through respective iterative convolutions of a zero-mean wiggly function whose mean is zero, and which has the property $f(-x)=f(+x)$, where $f(x)$ is nonzero at one or more points and a smoothing function derived from said wiggly function and orthogonal thereto, and wherein all of said convolutions with said wiggly function are retained to extract a feature vector having a plurality of vector components with respective coefficients and to provide translation invariance and reflection invariance;

analyzing statistically said plurality of vector components to determine median values of said physical texture properties;

determining a plurality of similar predetermined vectors to said extracted vector, and identifying said article of produce as similar to the group of articles represented by said plurality of similar vectors.

34. A method of extracting a translation invariant physical feature vector through application of a wavelet transform on data representing a physical image, said method for use with a computer having memory and including the steps of:

selecting an even zero-mean wiggly function whose mean is zero, and which has the property $f(-x)=f(+x)$, where $f(x)$ is nonzero at one or more points;

deriving a smoothing function S, said smoothing function being orthogonal to F;

convolving a first copy of said intensity data with F to generate respective component vector coefficients;

dropping alternate points;

storing said component coefficients in said memory;

convolving a second copy of said intensity data with S to generate a smoothed set of said data;

dropping alternate points;

determining whether said reduced output data is longer than S; and iterating said convolving, storing, and determining steps until said reduced data is shorter than S, whereby said component vectors collectively comprise said physical feature vector.

35. A method according to claim 34 and further including the step of:

analyzing statistically said plurality of vector components to determine robust estimates of the physical surface properties.

36. A method according to claim 35 wherein said analyzing step includes determining the robust estimate for the curvature of at least one vector component using a median operation.

37. A method according to claim 35 wherein said analyzing step includes determining the robust estimate for the roughness of at least one vector component using a median operation.

38. A method as in claim 37 wherein image data defines a photograph, fingerprint or retinal image.

39. A method as in claim 38 wherein said set of predetermined feature vectors represent one of the color and condition of a type of produce.

40. A method of classifying a physical image defined by data stored in a computer memory, said data representing particular physical surface properties of a surface of an object, said method including the steps of:

acquiring data representative of said surface with a scanner having an output coupled to a computer;

acquiring at least one scan by said scanner by means of a window exposed to the environment through which a beam of light from said scanner projects in the absence of said object;

determining scattered light data from said window based on said scan;

conditioning said data based on recording 3 or more levels of brightness for said window scan to compensate for said scattered light data;

applying a wavelet transform to said data to extract a translation invariant and reflection invariant physical feature vector comprising a plurality of vector components having respective coefficients corresponding to at least one physical property of the surface; and comparing said extracted feature vector to a set of predetermined feature vectors representing a plurality of image types to determine whether said image has a similar vector to any one of said predetermined vectors included in said set.

41. A method as in claim 40 wherein said image data defines a photograph, fingerprint or retinal image.

* * * * *